(12) United States Patent
Chung

(10) Patent No.: US 6,281,783 B1
(45) Date of Patent: Aug. 28, 2001

(54) AUTO RESISTANCE MATCHING MEANS FOR DISTRIBUTION BOXES

(75) Inventor: Jui-Huang Chung, Taipei (TW)

(73) Assignee: Signal CATV System, Inc., Tou-Chen I'Lan (TW)

( * ) Notice: Subject to any disclaimer, the term of this patent is extended or adjusted under 35 U.S.C. 154(b) by 0 days.

(21) Appl. No.: 09/482,778

(22) Filed: Jan. 13, 2000

(51) Int. Cl.⁷ .................................................. H01L 13/00

(52) U.S. Cl. .......................... 338/216; 333/22 R; 333/32

(58) Field of Search ................................... 333/22 R, 32, 333/105; 338/216

(56) References Cited

U.S. PATENT DOCUMENTS

| | | | |
|---|---|---|---|
| 2,640,118 | * | 5/1953 | Werner ................................. 338/216 |
| 2,958,054 | * | 10/1960 | Concelman ........................... 338/216 |
| 3,940,584 | * | 2/1976 | Cauldwell et al. ............... 200/152 S |
| 4,507,627 | * | 3/1985 | Ito et al. ............................... 333/105 |
| 5,280,254 | * | 1/1994 | Hunter et al. ....................... 333/22 R |
| 5,598,132 | * | 1/1997 | Stabile ................................ 333/22 R |

* cited by examiner

Primary Examiner—Karl D. Easthom
(74) Attorney, Agent, or Firm—Alan D. Kamrath; Rider, Bennett, Egan & Arundel, LLP

(57) ABSTRACT

An auto resistance device for distribution boxes, which can automatically provide grounding for a cable connector of a distribution box before a cable is connected or remove the grounding after the cable is connected is disclosed.

11 Claims, 3 Drawing Sheets

AUTO RESISTANCE MATCHING MEANS FOR DISTRIBUTION BOXES

BACKGROUND OF THE INVENTION

1. Field of the Invention

The invention relates to a distribution box, especially to a distribution box with an auto resistance matching means which can automatically either provide grounding for a connector of a distribution box before a cable is connected, or remove the grounding after the cable is connected.

2. Description of Related Art

Distribution boxes are used to integrate and/or distribute signals. Shown in FIG. 4 is a conventional distribution box (50). The distribution box (50) has a plurality of connectors (52) formed on walls of a box-like body. Each connector (52) has an inner terminal electrically connecting therewith and an interior distribution circuit. The distributor circuit can integrate and/or distribute signals coming from one or more cables (30) electrically connecting therewith.

In this kind of distributor, the distributor circuit is not able to judge whether a connector (52) is connecting with a cable or not and will send signals indiscriminately to every connector (52). Signals to a connector (52) which does not have a cable (30) connection therewith will have a negative effect in the form of decay or interference the signals sent to other connectors, (52). For example, in the case of cable TV, the amount of connectors (52) of the distributors is often very large, and the aforementioned effect is therefore also very serious.

This problem is often resolved by connecting a grounding line to the connectors (52) that do not have a cable connecting therewith. However, it is very strenuous labor to insert a grounding line into the connectors (52) that are not in use, remove the grounding line from the connectors (52) if insertion of a cable (30) is needed, and replace the cable (30) with a grounding line if the signal sent to the cable (30) is not needed any longer, especially when the connectors are in a great amount.

SUMMARY OF THE INVENTION

The main objective of the invention is to provide a distribution box with an auto resistance matching means which can automatically either provide grounding for a connector of a distribution box before a cable is connected, or remove the grounding after the cable is connected, thereby significantly simplifying the grounding process of the distribution boxes.

Other objects, advantages and novel features of the invention will become more apparent from the following detailed description when taken in conjunction with the accompanying drawings.

| REFERENCE NUMBERS | |
|---|---|
| 10.distribution box | 12.connector |
| 14.distribution circuit | 15.grounding pole |
| 16.matching resistance | 17.insulation pillar |
| 18.metal spring | |
| 20.slide tube | 202.tail |
| 204.circular groove | 22.core |
| 222.front hook | 224.rear hook |
| 24.clamp | 30.cable |
| 50.distribution box | 52.connector |

DETAILED DESCRIPTION OF THE PREFERRED EMBODIMENT

Figure 1:
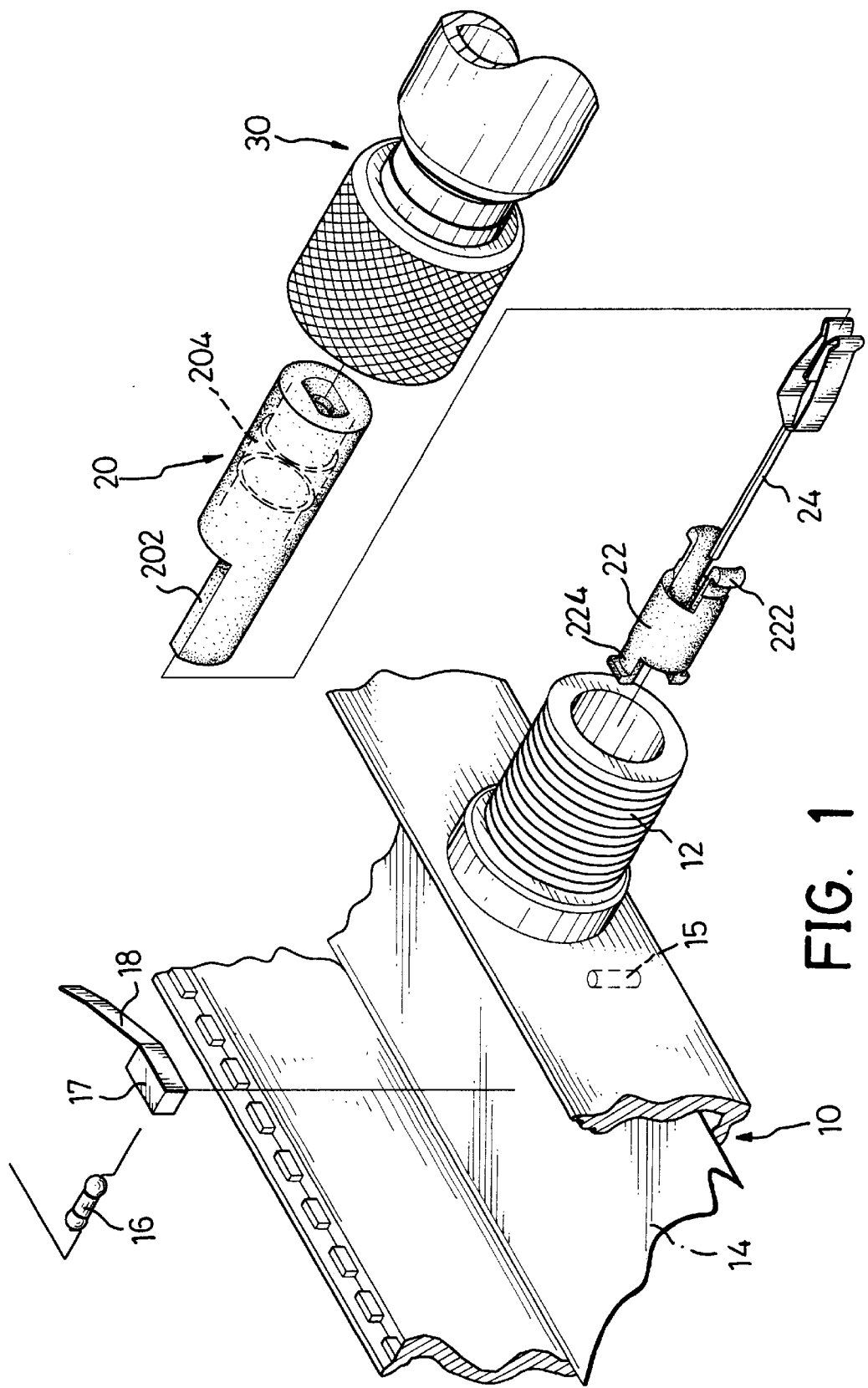
FIG. 1 is an exploded perspective view of the invention.

FIG. 1 shows the invention, a distribution box with an auto resistance matching means (10).

The distribution box (10) is a box-like body having side walls and containing a distribution circuit (14) therein. One, as an example, of a plurality of hollow connectors (12) is formed on one of the side walls. A grounding pole (15) is formed in the distribution box (10) and is close to the connector (12). Still referring to FIG. 1 and additionally to FIG. 2, an insulation pillar (17) is also formed in the distribution box (10) and is close to the grounding pole (15). The insulation pillar (17) has a metal spring (18) attached thereon and extending therefrom in the direction of the grounding pole (15). A resistance (16), the value of which is often at 75 Ω, electrically connects with the metal spring (18) with a first end thereof, and with the distribution circuit (14) with a free second end. As the characteristics of the distribution circuit (14) will not change with amount of the connectors (12) and it is not a part of the invention; it will not be described in detail herein.

A slide tube (20) is received in the connector (12) and has a circular groove (204) defined in an inner surface thereof, and the diameter of the circular groove (204) is a little greater than that of the inner surface. The function of the circular groove (204) will be described hereinafter. The slide tube (20) also has a tail (202) extending from one end thereof and is formed along a longitudinal axis of the slide tube (20).

A core (22) made of elastic material has a pair of front hooks (222) and a pair of rear hooks (224). A metal clamp (24) is inserted through, and affixed with respect to, the core (22), and electrically connects with the distribution circuit (14).

Figure 2:
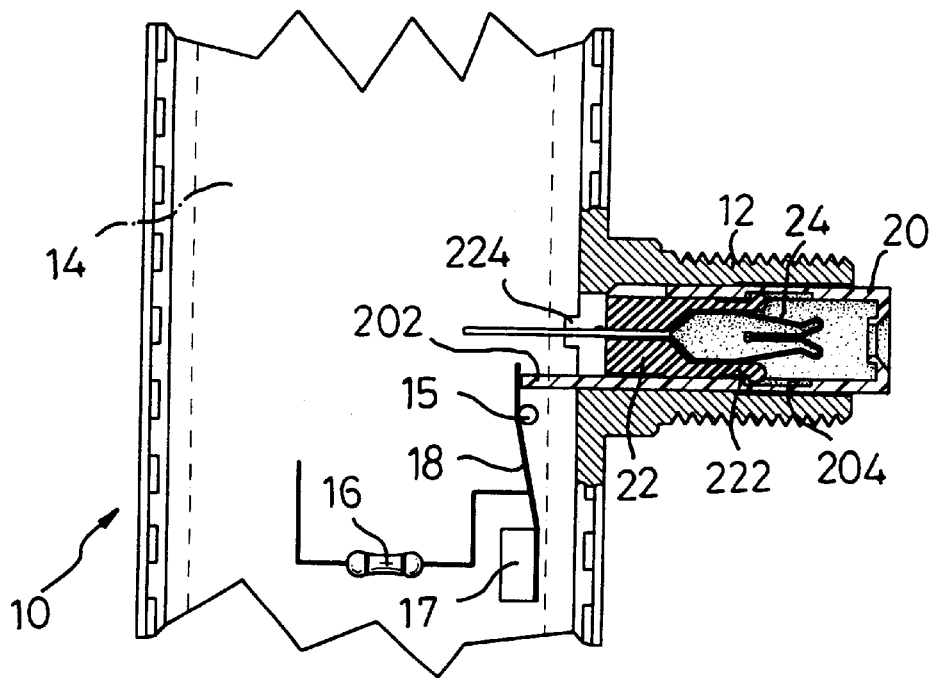
FIG. 2 is a cross-sectional view of the invention before a cable is connected.

In assembly, as shown in FIG. 2, the core (22) is inserted into the slide tube (20) until the front hooks (222) engage with the aforementioned circular groove (204). The engagement between the front hooks (222) with the circular groove (204) ensures that the slide tube (20) is able to slide with respect to the core (22) but the scope of the slide is limited by the situation and length of the circular groove (204). Then the core (22), together with the slide tube (20), is inserted into the connector (12), until the rear hooks (224) engage with the inner surface of the side wall.

At this time, the metal spring (18) electrically connects with the grounding pole (15), and is in a slight distance from the tail (202). Therefore, the signals coming from the distribution circuit (14) will be sent to ground via the resistance (16), the metal spring (18), and the grounding pole (15).

Figure 3:
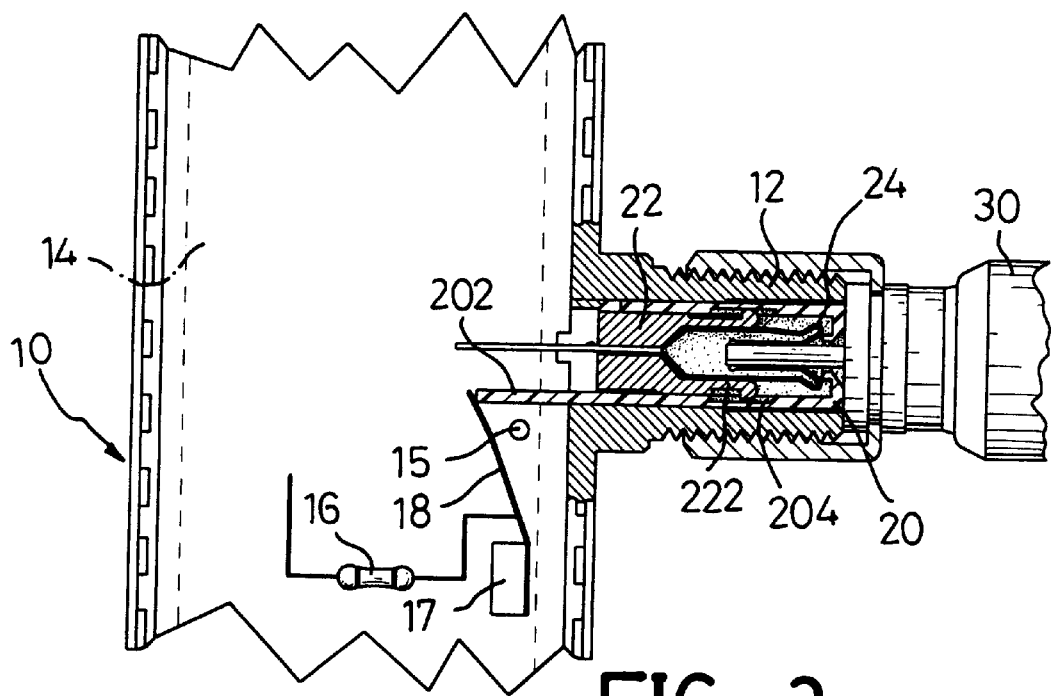
FIG. 3 is a cross-sectional view of the invention after the cable is connected; and, FIG. 4 is a perspective view of a conventional distribution box.
Figure 4:
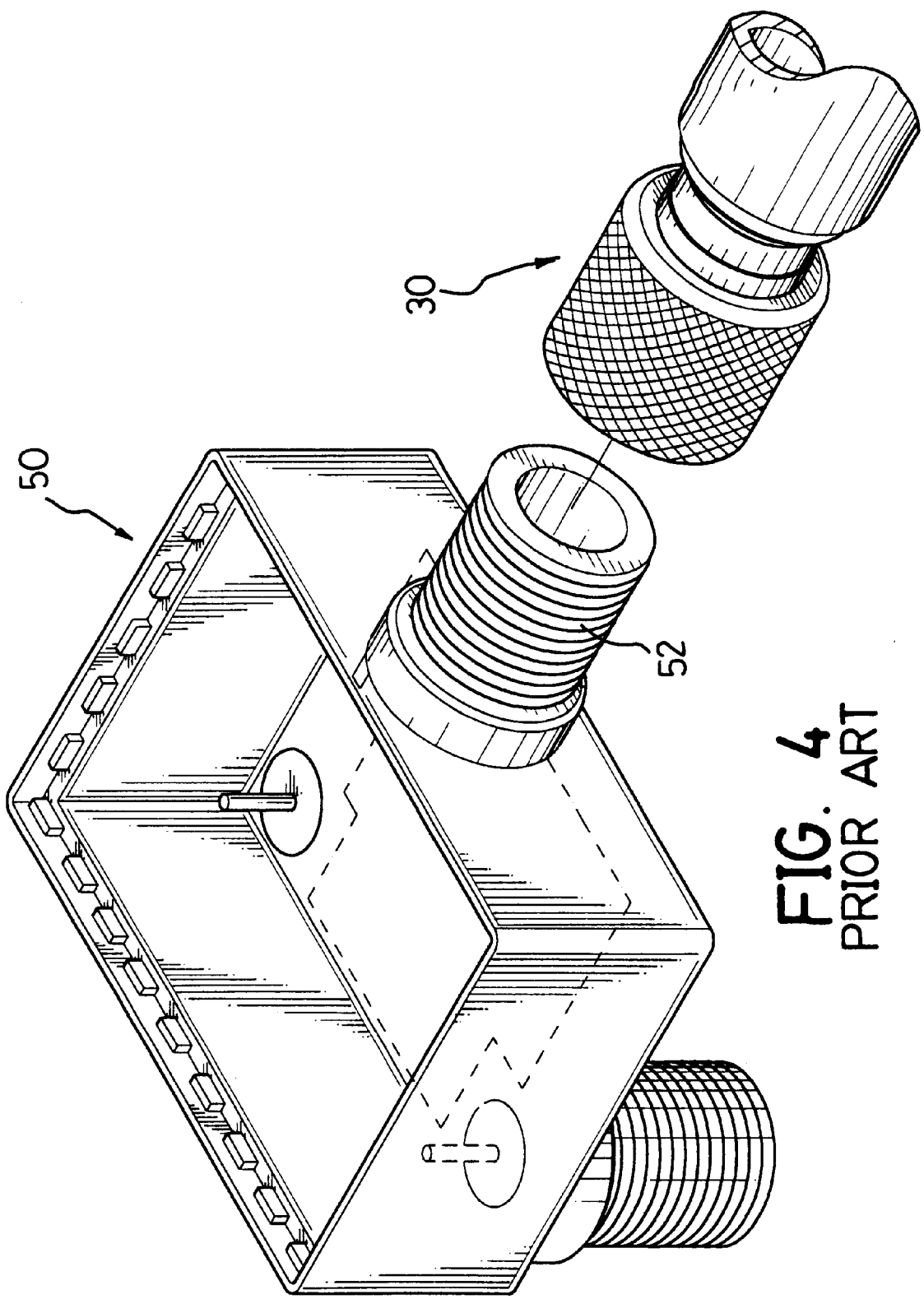

As shown in FIG. 3, when a cable (30) is inserted into the slide tube (20), the slide tube (20) will be pressed inward. The tail (202) then will push the metal spring (18) to depart the grounding pole (15). At this time, the signals coming from the distribution circuit (14) will only be able to be sent to the cable via the clamp (24).

The metal spring (18) is elastic so when the cable (30) is removed, it will push the slide tube (20) outward and resume the status as shown in FIG. 2.

From the above description, it could be seen that the invention can greatly simplify the grounding process of the distribution box.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A distribution box with an auto resistance matching means comprising:

a distribution circuit in the distribution box;

multiple connectors formed on side walls of the distribution box, the connectors being hollow;

a grounding pole formed in the distribution box and being close to the connector;

an insulation pillar formed in the distribution box;

a metal spring attached to the insulation pillar and extending in the direction of the grounding pole, and electrically connecting a free end thereof with the grounding pole;

a resistance electrically connecting with the metal spring with a first end thereof, and with the distribution circuit with a free second end;

a slide tube received in the connector and having a tail extending from one end thereof and being formed substantially along a longitudinal axis of the slide tube;

a core inserted into the slide tube and being slidable with respect to the slide tube, the core having a pair of front hooks and a pair of rear hooks, and the slide tube having a circular groove defined in an inner surface of the slide tube, wherein the diameter of the circular groove is a little greater than that of the inner surface of the slide tube; and a clamp being inserted through, and affixed with respect to, the core, and electrically connecting with the distribution circuit.

2. A distribution box for containing a distribution circuit therein, comprising, in combination: a connector for a cable; a grounding pole close to the connector; an insulation pillar; a metal spring affixed to the insulation pillar; a resistance having a first end electrically connected to the metal spring and a second end adapted to be electrically connected to the distribution circuit; a slide tube having a tail extending from one end thereof and slideable between an inner position and an outward position in the slide tube, with the tail of the slide tube engaging with and pushing the spring; and a clamp carried by the slide tube and adapted to be electrically connected to the distribution circuit and to the cable, with the spring electrically connecting the resistance to the grounding pole when the slide tube is in the outward position so that any signals coming from the distribution circuit will be sent to ground via the resistance, the metal spring and the grounding pole and with the spring being departed from the grounding pole when the slide tube is in the inner position so that any signals coming from the distribution circuit will be sent to the cable via the clamp for a cable.

3. The distribution box as claimed in claim 2 wherein the spring biases the slide tube from the inner position to the outer position.

4. The distribution box as claimed in claim 3 further comprising, in combination: a core inserted in the slide tube and being slideable with respect to the slide tube, with the clamp being insertable through and affixed to the core.

5. The distribution box as claimed in claim 4, wherein the core has a pair of front hooks, and the slide tube has a circular groove defined in an inner surface of the slide tube and wherein the diameter of the circular groove is a little greater than the diameter of the inner surface.

6. The distribution box as claimed in claim 5 wherein the core has a pair of rear hooks.

7. The auto resistance matching means for distribution boxes as claimed in claim 6 wherein the value of the resistance is 75 Ω.

8. The distribution box as claimed in claim 4 wherein the core has a pair of rear hooks.

9. The distribution box as claimed in claim 4 wherein the core has a pair of front hooks, and the slide tube has a circular groove defined in an inner surface of the slide tube, and wherein the diameter of the circular groove is a little greater than the diameter of the inner surface.

10. The distribution box as claimed in claim 9 wherein the core has a pair of rear hooks.

11. The distribution box as claimed in claim 2 further comprising, in combination: a core inserted in the slide tube and being slideable with respect to the slide tube, with the clamp being insertable through and affixed to the core.

* * * * *